Oct. 11, 1955     E. J. KOVALCHIK ET AL     2,720,365
FISHING REEL
Filed Aug. 22, 1952
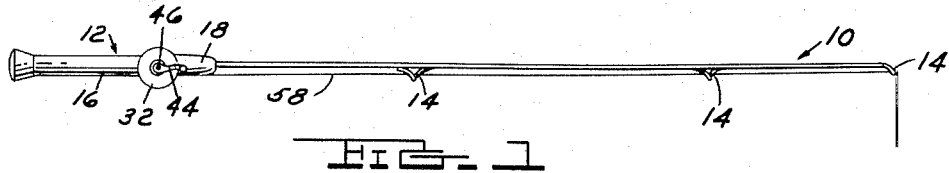
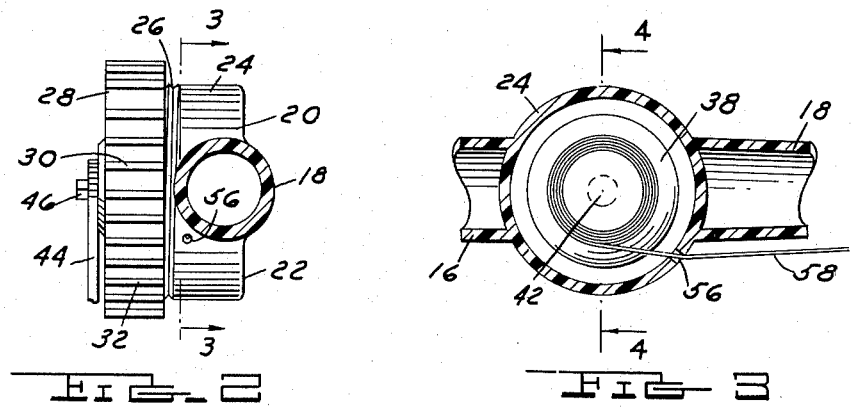
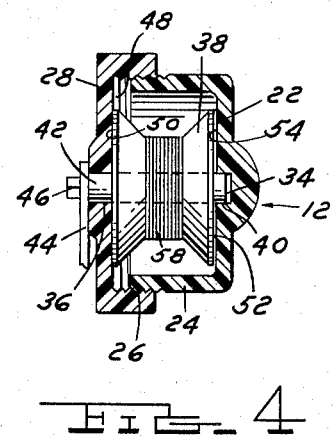
INVENTORS
EVERETT J. KOVALCHIK
JOHN J. PASTOR
BY
ATTORNEYS

United States Patent Office 2,720,365
Patented Oct. 11, 1955

2,720,365
FISHING REEL
Everett J. Kovalchik, Wyandotte, and John J. Pastor, Rockwood, Mich.

Application August 22, 1952, Serial No. 305,748

2 Claims. (Cl. 242—84.5)

This invention relates to a fishing rod and particularly to a fishing rod provided with a reel admirably suited for fishing through the ice.

An object of the invention is to provide a fishing reel of simple design and employing a minimum of parts to prevent the likelihood of the reel freezing tight.

Another object of the invention is to provide a reel which is substantially completely enclosed to prevent the accumulation of water therein which would normally freeze into ice and thereby prevent free turning of the reel spool.

In the drawings:

Fig. 1 is a side elevation of a fishing rod of this invention.

Fig. 2 is a sectional view of the rod taken just forwardly of the reel and as viewed from the tip end of the rod.

Fig. 3 is a sectional view along the lines 3—3 in Fig. 2.

Fig. 4 is a sectional view along the lines 4—4 in Fig. 3.

Referring to the drawings, the fishing rod of this invention is illustrated as having a flexible shaft portion 10 and a handle portion 12 which can be either permanently connected together or detachably connected together by means of a socket (not shown) at the forward end of the handle 12. The shaft portion 10 is preferably formed of glass fiber or the like to which ice will not readily adhere. Handle 12 is also formed of a material to which ice will not readily adhere. The handle may, for example, be formed of plastic or hard rubber and may be given a special treatment so as to reduce to a minimum the tendency for ice to adhere to the handle. Shaft 10 is provided with a plurality of conventional eyelets 14 which serve as guides for the fishing line.

The handle 12 includes a cylindrical rear portion 16 and a generally cylindrical nose or front portion 18. Intermediate the portions 16 and 18 the handle 12 is fashioned with a cylindrical housing 20. Housing 20 has an end wall 22 and an axially extending circumferential wall 24 which extends from the end wall 22 to the open end of the housing. Adjacent the open end of the housing the wall 24 is threaded as at 26 to threadedly receive a cover member 28. Cover 28 has an axially extending circumferential wall 30 which overlies the outer end portion of wall 24. If desired, the circumferential wall 30 of cover 28 may be serrated around the outer surface thereof as at 32 to provide means for securely gripping and turning cover 28. The end wall 22 is formed with a bearing 34 at the axial center thereof. The housing 20 is preferably molded integrally with the handle 12 from a plastic material, and the bearing 34 simply comprises a cylindrical socket in the housing. Cover 28 is likewise provided with a cylindrical opening 36 therethrough which is aligned axially with the bearing 34.

Within housing 20 there is arranged a line spool 38 which is also preferably formed of plastic. Spool 38 has integral stub shafts 40 and 42 which project, respectively, into the bearings formed by the apertures 34 and 36. A handle member 44 is fixed at the outer end of stub shaft 42 such as by a screw 46 and provides a driving connection between handle 44 and stub shaft 42. Spool 38 has a width substantially greater than the width of the circumferential wall 24 of the housing. Thus, when the reel is assembled, spool 38 projects outwardly beyond the outer edge of wall 24. The cover member 28 is arranged to be threaded over circumferential wall 24 so that the inner face 48 of cover 28 engages one side face 50 of spool 38 and so that the other flat end face 52 of spool 38 engages the flat inner face 54 of housing 20. Thus, by threading cover 28 either toward or away from the inner face 54, the spool 38 can be securely locked in place against rotation or permitted to rotate freely within bearings 36 and 40.

On the front lower side thereof the circumferential wall 24 of housing 20 is provided with an aperture 56 through which the line 58 extends. Line 58 is arranged to be wound on spool 38 by rotating handle 44. It will be observed that opening 56 is disposed adjacent the bottom run of the line on spool 38. It will also be observed that opening 56 is fashioned such that, when the line is reeled in, the outer edge of the opening 56 engages the top side of the line and the lower edge of opening 56 engages the lower face of the line. Thus, the opening 56 serves to effectively wipe the line free of water.

Thus, it will be seen that I have provided a fishing rod which is admirably suited for ice fishing. In the first place, the rod handle and reel are formed of plastic or other material to which ice would not readily adhere. Furthermore, it will be observed that the reel is formed with a minimum of moving parts, it being appreciated that the fewer the moving parts, the less likely is the tendency for the reel to freeze tight. The reel itself is molded with stub axles projecting from the opposite end faces thereof, and simple bearings are formed directly in the plastic of the housing 20 and cover 28. This again helps to prevent the formation of ice within the reel. Also tending to prevent the formation and an accumulation of ice within the reel is the aperture 56 in the reel housing which engages the top and bottom surface portions of the line to wipe the water therefrom as the line is reeled up on the spool 38 within housing 20.

Also of considerable advantage from the standpoint of ice fishing is the fact that the spool 38 is substantially completely enclosed within housing 20 and the fact that the spool can be locked or released by simply threading the cover 28 towards or away from the back wall 54 of the housing. The clamping action of the cover on the spool is enhanced by the formation of flat surfaces on both the ends of the spool and the inner cooperating faces of the cover 28 and housing 20 which provide considerable friction.

We claim:

1. In a fishing reel, the combination of a cylindrical housing open at one end thereof, the cylindrical wall of said housing adjacent said open end being threaded, a cover threadedly engaged with the thread on said cylindrical wall and forming a wall closing the open end of said housing, said cover being adjustable on said thread in a direction toward and away from the closed end wall of said housing, said cover and said end wall of said housing having axially aligned bearings, a spool in said housing having an axle projecting from opposite side faces thereof, said axle being journalled in said bearings, said cover being advanceable on said thread in a direction towards said end wall of said housing to a position wherein the distance between the inner face of said end wall and the inner face of said cover are spaced apart a distance less than the axial extent of said spool whereby said cover may be advanced on said thread to clamp said spool between said cover and said end wall of the housing, said axle at one end extending through the adjacent end wall of said housing and a handle secured to said end of said axle for turning said spool.

2. In a fishing reel, the combination of a cylindrical housing open at one end thereof, the cylindrical wall of said housing adjacent said open end being threaded, a cover threadedly engaged with the thread on said cylindrical wall and forming a wall closing the open end of said housing, said cover being adjustable on said thread in a direction toward and away from the closed end wall of said housing, said cover and said end wall of said housing having axially aligned bearings, a spool in said housing having an axle projecting from opposite side faces thereof, said axle being journalled in said bearings, said spool having braking faces at opposite ends thereof, said end wall of said housing and said cover having braking faces positioned to engage with the braking faces at the opposite ends of said spool, said cover being advanceable on said thread in a direction towards said end wall to bring the braking faces on said cover and end wall into braking engagement with the braking faces at the opposite ends of said spool, said axle at one end extending through the adjacent end wall of the housing and a handle secured to said end of said axle for turning said spool.

References Cited in the file of this patent

UNITED STATES PATENTS

| | | |
|---|---|---|
| 301,055 | Greene | June 24, 1884 |
| 1,567,483 | Bear | Dec. 29, 1925 |
| 1,826,465 | Gilman | Oct. 6, 1931 |
| 1,932,360 | Adams | Oct. 24, 1933 |
| 2,402,882 | Garr | June 25, 1946 |
| 2,615,352 | Mies | Oct. 28, 1952 |

FOREIGN PATENTS

| | | |
|---|---|---|
| 606,986 | France | Mar. 20, 1925 |